United States Patent
Okuma et al.

(10) Patent No.: US 10,815,716 B2
(45) Date of Patent: Oct. 27, 2020

(54) TOUCH SENSOR APPARATUS FOR USE WITH VEHICLES

(71) Applicant: AISIN TECHNICAL CENTER OF AMERICA, INC., Northville, MI (US)

(72) Inventors: Emiko Okuma, Novi, MI (US); Yasuo Imatomi, Commerce Township, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 99 days.

(21) Appl. No.: 16/151,459

(22) Filed: Oct. 4, 2018

(65) Prior Publication Data

US 2020/0109590 A1 Apr. 9, 2020

(51) Int. Cl.
*E05F 15/75* (2015.01)
*B60K 26/02* (2006.01)
*B60J 10/246* (2016.01)

(52) U.S. Cl.
CPC ............. *E05F 15/75* (2015.01); *B60J 10/246* (2016.02); *B60K 26/02* (2013.01); *B60K 2026/025* (2013.01); *B60K 2370/1446* (2019.05); *E05Y 2400/86* (2013.01); *E05Y 2900/546* (2013.01)

(58) Field of Classification Search
CPC ... E05F 15/75; B60K 26/02; B60K 2026/025; B60K 2370/1446; B60J 10/246; E05Y 2400/86; E05Y 2900/546
See application file for complete search history.

(56) References Cited

U.S. PATENT DOCUMENTS

| 7,293,467 | B2 | 11/2007 | Shank et al. |
| 7,712,256 | B2 | 5/2010 | Kato et al. |
| 7,812,721 | B2 | 10/2010 | Hoshina et al. |
| 9,759,003 | B2 * | 9/2017 | Hirakawa ............. E05F 15/443 |

FOREIGN PATENT DOCUMENTS

| EP | 2 479 893 A1 | 7/2012 |
| JP | 2000-199375 A | 7/2000 |
| JP | 2007-332764 A | 12/2007 |
| JP | 4900064 B2 | 3/2012 |
| JP | 5009863 B3 | 8/2012 |
| JP | 6317144 B2 | 4/2018 |

* cited by examiner

*Primary Examiner* — D Glenn Dayoan
*Assistant Examiner* — Melissa Ann Bonifazi
(74) *Attorney, Agent, or Firm* — Oblon, McClelland, Maier & Neustadt, L.L.P.

(57) ABSTRACT

Touch sensor apparatus for use with vehicles are disclosed. A disclosed touch sensor assembly for a vehicle gate includes a sensor configured to operatively couple to the vehicle gate. The touch sensor assembly also includes a cover having a tubular body that extends over the sensor and ribs interposed between the tubular body and the sensor. At least one of the ribs is configured to transfer a load from the tubular body to the sensor to change a state of the sensor.

14 Claims, 6 Drawing Sheets

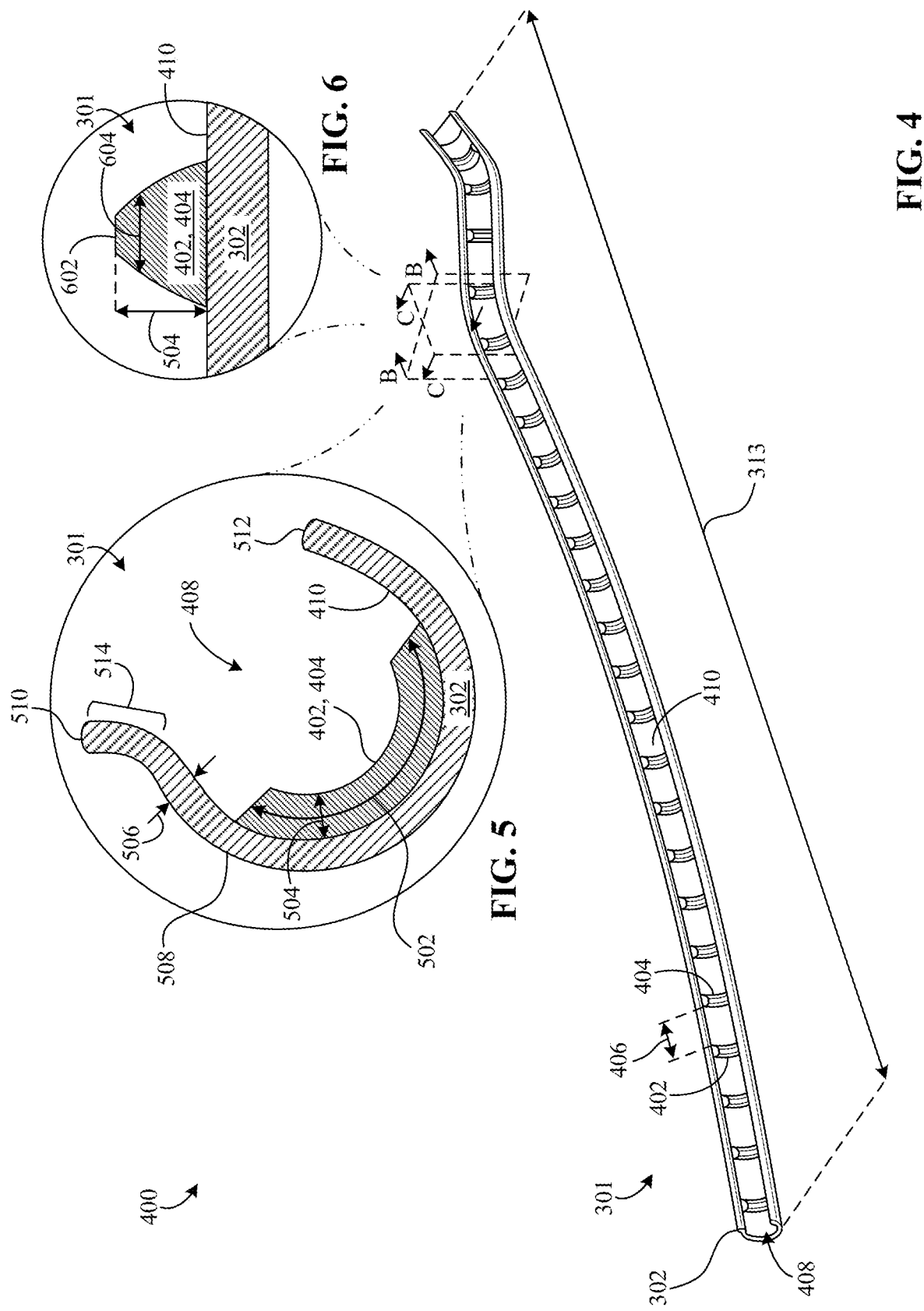

US 10,815,716 B2

TOUCH SENSOR APPARATUS FOR USE WITH VEHICLES

FIELD OF THE DISCLOSURE

This disclosure relates generally to vehicles and, more particularly, to touch sensor apparatus for use with vehicles.

BACKGROUND

Motor vehicles typically employ sensor systems to improve vehicle safety, performance, handling, comfort, etc. Some vehicles having automatic gate functionality utilize a touch sensor positioned on a side of a vehicle liftgate, which improves vehicle safety during operation of the liftgate. For example, as the liftgate closes via an actuation system associated therewith, an electronic control unit (ECU) detects, via the touch sensor, objects or users caught and/or otherwise positioned between the liftgate and a portion of a vehicle body near the liftgate. In response to such a detection, the ECU controls the actuation system to cease closing and/or move the liftgate to an open position, thereby preventing injury and/or vehicle damage.

SUMMARY

An example touch sensor assembly for a vehicle gate includes a sensor configured to operatively couple to the vehicle gate. The touch sensor assembly also includes a cover having a tubular body that extends over the sensor and ribs interposed between the tubular body and the sensor. At least one of the ribs is configured to transfer a load from the tubular body to the sensor to change a state of the sensor.

An example apparatus includes a vehicle touch sensor having a sensing portion that is cylindrically shaped. The apparatus also includes a cover coupled to the touch sensor that defines an inner channel having the sensing portion therein. A wall formed by the inner channel has protrusions thereon that extend toward the sensing portion. At least one of the protrusions is configured to impart a first load on the sensing portion when on a second load is imparted on the cover.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a detailed view of an example sensor cover of the example sensor assembly of FIG. 3 and shows an example configuration thereof;

FIG. 5 is a cross-sectional view of the example sensor cover of FIG. 4 along line B-B;

FIG. 6 is a cross-sectional view of the example sensor cover of FIG. 4 along line C-C;

The figures are not to scale. In general, the same reference numbers will be used throughout the drawing(s) and accompanying written description to refer to the same or like parts.

DETAILED DESCRIPTION

Figure 1:
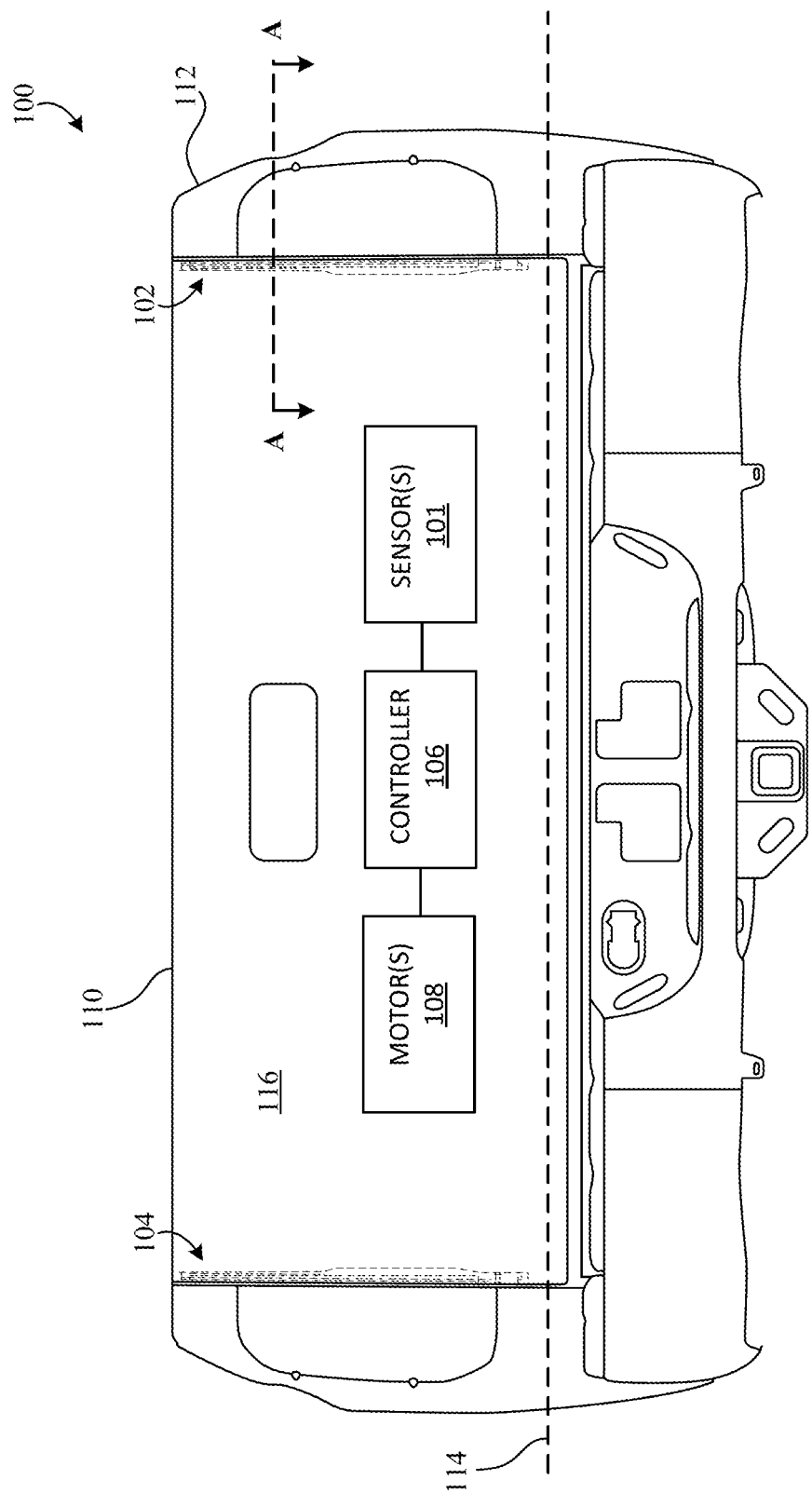
FIG. 1 is a view of an example vehicle in which examples disclosed herein can be implemented.

Some known touch sensor assemblies for a liftgate of a vehicle include a touch sensor having a particular portion (e.g., a cylindrical portion containing a circuit) that is configured to deform, which facilitates object detection. In particular, when a force or load is imparted on the portion of the touch sensor (e.g., resulting from closure of the liftgate), an ECU operatively coupled to the touch sensor detects a change in a resistance and/or a short circuit associated with the touch sensor caused by the load. To prevent sensor damage (e.g., caused by loading or unloading vehicle cargo, users entering or exiting the vehicle, etc.), some known touch sensor assemblies use protectors or casings that extend over or contain the touch sensor therein. However, effectiveness of these known touch sensor casings is dependent on characteristics and/parameters of the casings. For example, some known touch sensor casings have a relatively thin and/or flexible outer wall to facilitate deforming the touch sensor, which provides limited protection to the touch sensor. On the other hand, some known touch sensor casings having a relatively thick and/or rigid outer wall to better protect the touch sensor from damage, which prevents the touch sensor from sufficiently deforming and/or otherwise functioning properly. As a result, such known touch sensor casings may fail to protect vehicle touch sensors and/or reduce effectiveness in providing object detection.

To further prevent sensor damage, these known touch sensor assemblies are typically attached to opposing sides of the liftgate. Accordingly, when the liftgate is open, the touch sensor assemblies are positioned above a cargo space of the vehicle such that vehicle cargo does not interfere and/or contact an associated touch sensor when loaded into or unloaded from the vehicle via the liftgate. However, the above-mentioned known touch sensor assemblies are not suitable for use with a vehicle tailgate and, in particular, may be prone to damage caused by cargo and/or users entering or exiting the vehicle via the tailgate. For example, when the tailgate is open, vehicle cargo often passes over and/or contacts the tailgate, which may damage a touch sensor. Additionally, users may inadvertently damage a touch sensor when entering and exiting the cargo space via the tailgate.

Touch sensor apparatus for use with vehicles are disclosed. Examples disclosed herein provide an example sensor assembly that is configured to operatively to a gate (e.g., a tailgate) of a vehicle such that a vehicle controller (e.g., an ECU) is enabled to detect an object (and/or a user) that may interfere with operation of the gate. For example, the object may be caught and/or otherwise positioned between the gate and a body of the vehicle when the gate is closing. Additionally, the vehicle controller controls movement of the gate, for example, via a motor operatively coupled to the gate. In particular, the disclosed sensor assembly includes an example sensor (e.g., a touch sensor) that is positioned on the tailgate and configured to change state when pressed during closure of the gate. In response to the touch sensor changing from a first state (e.g., associated with a first electrical resistance) to a second state (e.g., associated with a second electrical resistance that is less than the first electrical resistance), the controller controls the motor to open and/or cease closing the gate, which improves vehicle safety and/or prevents damage to the gate or the vehicle.

The disclosed sensor assembly also includes an example sensor cover (e.g., constructed of a high plasticity resin) having a body that extends over the sensor. The body of the sensor cover is sized, shaped, structured, and/or otherwise configured to load the sensor as well as guard the sensor and/or prevent damage thereto, for example, caused by the object, a user entering or exiting the vehicle, a fluid (e.g., water), etc. In some examples, the body has a shape that is substantially tubular. In particular, the disclosed sensor cover includes example ribs that are positioned between the sensor and an inner surface of the body to facilitate loading the sensor. As such, when a force or load is imparted on an outer surface of the body, one or more of the ribs transfer the load from the body to the sensor to provide the second state of the sensor, which causes the ECU to detect this change in state of the sensor (e.g., a short circuit in the sensor) and control movement of the gate accordingly. In this manner, the sensor cover is enabled to have improved characteristics and/or parameters (e.g., a greater body thickness, a higher degree of hardness, strength, rigidity, stiffness, etc.) without adversely affecting functionality of the sensor, which would have otherwise been unattainable by using the above mentioned known vehicle touch sensor assemblies. As a result, disclosed examples effectively protect the sensor from damage while maintaining sensor effectiveness in providing object detection(s).

Additionally or alternatively, in some examples, the disclosed sensor assembly is similarly utilized for a door such as, for example, an automatic sliding door that is operatively coupled to the motor and/or the vehicle controller. In such examples, the sensor is positioned on a side (e.g., a front edge) of the door or part of the vehicle body near the door to detect an object (and/or a user) caught and/or otherwise positioned between the door and the vehicle body during closure of the door.

FIG. 1A is a view of an example vehicle (e.g., a car, a van, a truck, a sport utility vehicle (SUV), etc.) 100 in which examples disclosed herein can be implemented. According to the illustrated example of FIG. 1, the vehicle 100 includes one or more example sensors 101 that are associated with respective one or more sensor assemblies 102, 104 (as represented by the dotted/dashed lines in FIG. 1), two of which are shown in this examples (i.e., a first sensor assembly 102 and a second sensor assembly 104). Further, in some examples, the vehicle 100 also includes an example controller 106 and one or more example motors (e.g., electric motor(s)) 108. The controller 106 of FIG. 1 controls the motor(s) 108 to move an example gate (e.g., a tailgate) 110 of the vehicle 100 between a first positioned (e.g., a closed or raised position) (shown in FIG. 1) and a second position (e.g., an open or lowered position) (shown in FIG. 2). In particular, the controller 106 is configured to detect, via the sensor(s) 101, one or more objects (e.g., vehicle cargo, a person, etc.) positioned and/or caught between the gate 110 (and/or a vehicle door) and a body 112 of the vehicle 100 during closure and/or operation of the gate 110, as discussed further below in connection with FIGS. 2-10. In response to such a detection, the controller 106 controls the motor(s) 108 to open or cease movement of the gate 110 (and/or a door of the vehicle 100), which improves vehicle safety and/or prevents vehicle damage.

The controller 106 of FIG. 1 is implemented using, for example, one or more electronic control units (ECUs) that are operatively coupled to the vehicle 100. The controller 106 is communicatively coupled to sensor(s) 101 via a transmission or signal wire, a bus, radio frequency, etc. In particular, during operation of the gate 110, the controller 106 determines and/or monitors one or more electrical parameters (e.g., a resistance, a current, a voltage, etc.) associated the sensor(s) 101 to determine a change in a state of the sensor(s) 101 (e.g., a change in the electrical parameter(s)). In response to determining such a state change, the controller 106 generates a control or command signal for adjusting one or more parameters (e.g., motor output such as torque) of the motor(s) 108 and provides the control or command signal to the motor(s) 108.

To facilitate moving the gate 110, the motor(s) 108 are operatively coupled to the gate 110 and communicatively coupled to the controller 106. In particular, the motor(s) 108 are configured to generate a torque or force and impart the torque or force on at least a portion of the gate 110 (e.g., in response to receiving the control or command signal), thereby causing the gate 110 to rotate relative to an axis 114 (e.g., clockwise or counterclockwise) associated with the gate 110 between the first and second positions. As such, the gate 110 is pivotably coupled to the vehicle 100, for example, via one or more hinges interposed between the gate 110 and the vehicle body 112. Additionally or alternatively, in some examples, the motor(s) 108 are similarly coupled to one or more doors (e.g., a sliding door) of the vehicle 100 to control movement thereof. Although FIG. 1 depicts the vehicle 100 having the motor(s) 108, in some examples, the vehicle 100 includes one or more other suitable actuation systems that are operable by the controller 106 to move the gate 110 and/or the door(s).

The sensor(s) 101 of FIG. 1 include one or more touch sensors, one or more proximity sensors, and/or one or more other appropriate sensors associated with objection detection functionality. In particular, the sensor(s) 101 are configured to change from a first state (e.g., associated with a first electrical resistance) to a second state (e.g., associated with a second electrical resistance less than the first electrical resistance) when touched or pressed, which causes the controller 106 to adjust the motor parameter(s), as discussed further below in connection with FIGS. 7-10. As shown in FIG. 1, the first sensor assembly 102 and the second sensor assembly 104 are substantially hidden and/or covered by a first (e.g., an exterior) surface 116 of the vehicle gate 110.

Figure 2:
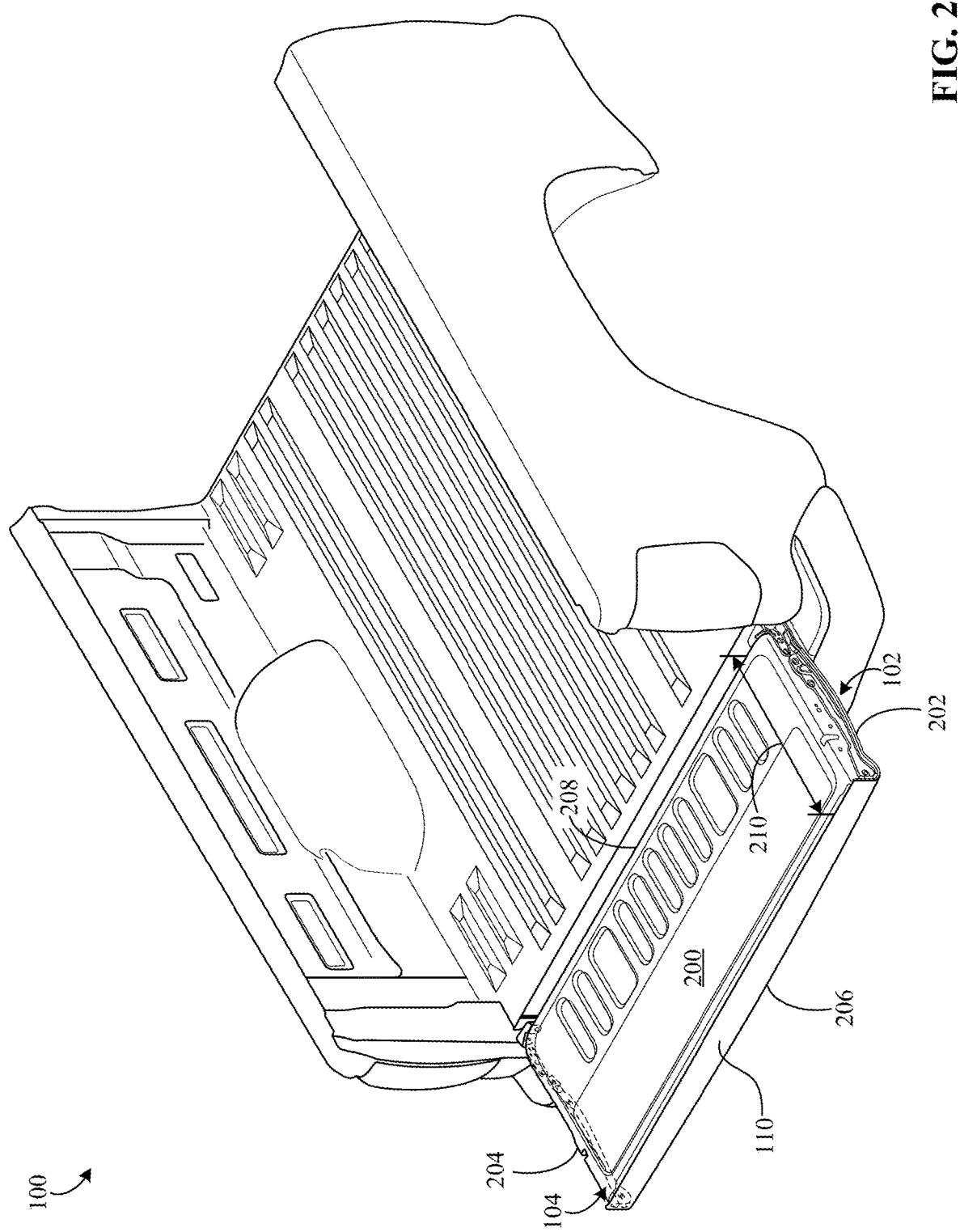
FIG. 2 is another view of the example vehicle of FIG. 1 and shows an example vehicle gate in a lowered position.

FIG. 2 is another view of the example vehicle 100 of FIG. 1 and shows the vehicle gate 110 in the lowered position, for example, resulting from motor output and/or user input provided to the gate 110. As shown in FIG. 2, the first and second sensor assemblies 102, 104 are at least partially exposed. The first sensor assembly 102 of FIG. 2 is positioned on a second (e.g., an interior) surface 200 of the gate 110, opposite the first surface 116, at a first side 202 of the vehicle gate 110. Further, the second sensor assembly 104 of FIG. 2 is positioned on the second surface 200 at a second side 204 of the vehicle gate 110 opposite the first side 202. As shown in FIG. 2, the first and second sensor assemblies 102, 104 extend between a third side 206 of the gate 110 and a fourth side 208 of the gate 110 opposite the third side 206. That is, the sensor assemblies 102, 104 extend across at least a portion of a height 210 of the gate 110 defined between the third and fourth sides 206, 208.

Although FIG. 2 depicts two sensor assemblies 102, 104, in some examples, the vehicle gate 110 is implemented using additional, fewer, and/or different sensor assemblies. Further, although FIG. 2 depicts the sensor assemblies 102, 104 particularly arranged on the vehicle gate 110, in some examples, the sensor assemblies 102, 104 are positioned differently relative to the vehicle 100. For example, at least one of the sensor assemblies 102, 104 is positioned on or near the door(s) of the vehicle 100.

Figure 3:
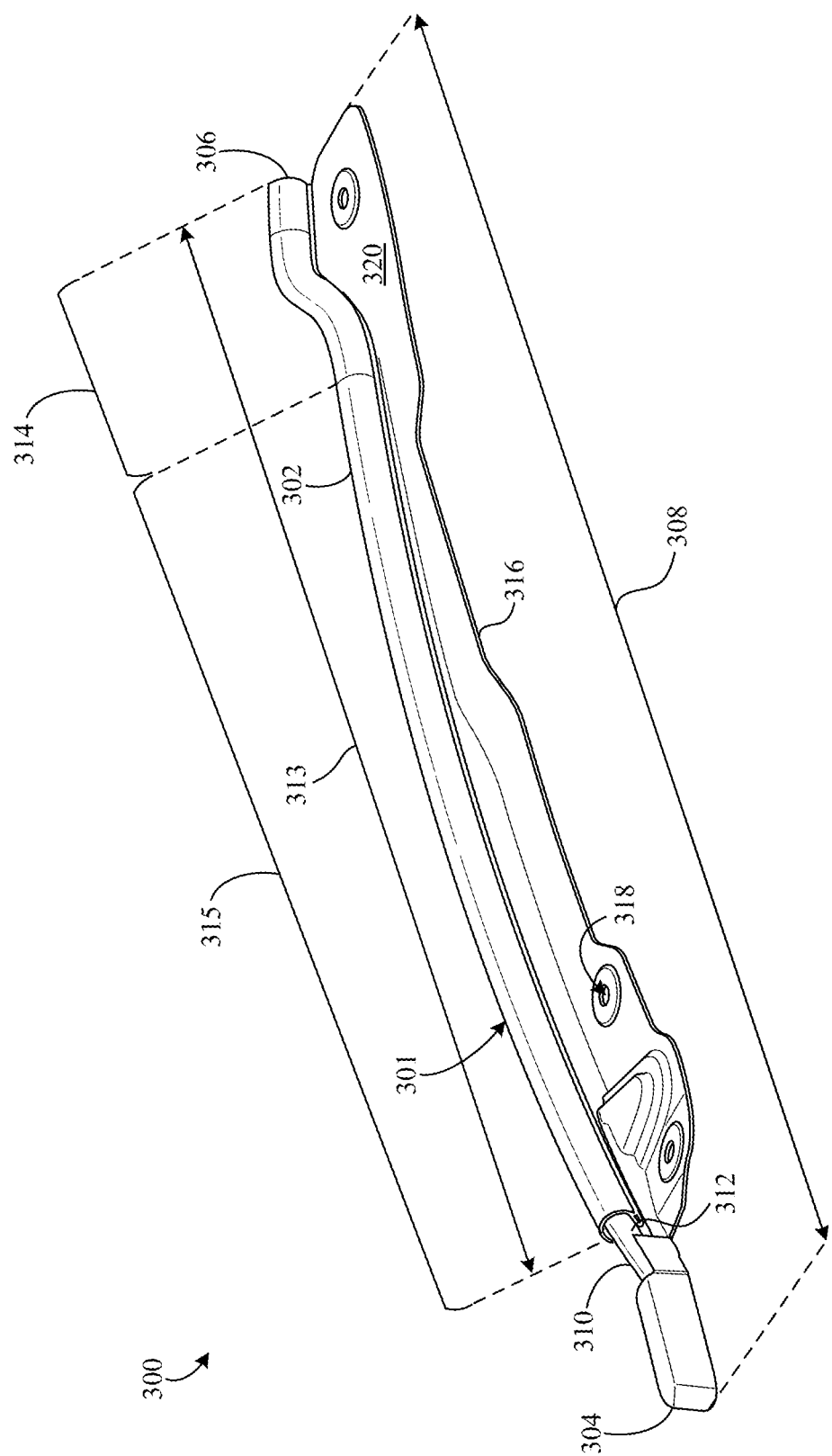
FIG. 3 is a detailed view of an example sensor assembly in accordance with the teachings of this disclosure.

FIG. 3 is a detailed view of an example third sensor assembly 300 in accordance with the teachings of this disclosure. In some examples, the third sensor assembly 300 corresponds to the first sensor assembly 102 and/or the second sensor assembly 104 of FIGS. 1 and 2. To guard the sensor(s) 101 and/or prevent damage thereto (e.g., caused by vehicle cargo, users, environment elements, etc.), the third sensor assembly 300 includes an example cover 301 defining a body (e.g., a hollow and/or tubular body) 302, which is sometimes referred to as a sensor cover. The body 302 of the cover 301 of FIG. 3 extends between a first end 304 of the third sensor assembly 300 and a second end 306 of the third sensor assembly 300 opposite the first end 304. That is, the body 302 extends across at least a portion of a length 308 (e.g., the entire length) defined between the first and second ends 304, 306.

The body 302 of FIG. 3 is affixed to an example protector (e.g., a hollow and/or tubular body) 310 having at least one of the aforementioned sensor(s) 101 positioned therein, which is partially exposed in this example. In particular, the protector 310 of FIG. 3 has a relatively thin wall (e.g., a circumferential wall) 708 (shown in FIG. 7) surrounding the sensor(s) 101 that is configured to flex, strain, and/or otherwise deform, which facilitates functionality of the sensor(s) 101. Further, the body 302 is sized, shaped, structured, and/or otherwise configured to receive at least a portion of the protector 310 and couple to an outer surface (e.g., a curved surface) 312 thereof, for example, via snap-fitting and/or one or more other fastening methods or techniques (e.g., via an adhesive). As shown in FIG. 3, the body 302 substantially covers the outer surface 312 of the protector 310. Additionally, in some examples, the protector 310 extends through the body 302 across at least a portion of a length 313 thereof.

In some examples, the body 302 and/or the sensor protector 310 are shaped to match and/or conform to a shape (e.g., a portion of the second vehicle surface 200 near the side(s) 202, 204) of the vehicle gate 110. For example, the body 302 and/or the protector 310 include a first particular portion 314 between the ends 304, 306 that is substantially curved (e.g., s-shaped), which allows the body 302 and/or the protector 310 to extend proximate to an edge 710 (shown in FIG. 7) of the vehicle gate 110. As such, a corresponding portion (e.g., the sensing portion 802 (shown in FIG. 8)) of the sensor(s) 101 is similarly curved. Further, as shown in FIG. 3, the body 302 and/or the protector 310 include a second particular portion 315, adjacent the first portion 314, between the ends 304, 306 that is substantially straight or slightly curved relative to the first portion 314.

In some examples, to facilitate affixing the third sensor assembly 300 to the vehicle gate 110, the third sensor assembly 300 includes an example bracket 316. The bracket 316 is configured to support the body 302 and protector 310 as well as secure a position and/or an orientation thereof relative to the vehicle gate 110, the vehicle door(s), and/or the vehicle body 112. As shown in FIG. 3, the bracket 316 includes one or more openings 318 disposed on an outer surface 320 of the bracket 316 for receiving a fastener (e.g., a bolt, a screw, etc.), three of which are shown in this example.

FIG. 4 is a detailed view of the sensor cover 301 of the example sensor assembly of FIG. 3 and shows an example configuration 400 thereof. According to the illustrated example of FIG. 4, the cover 301 includes example protrusions (e.g., ribs) 402, 404 for loading the sensor(s) 101, twenty four of which are shown in this example. For clarity, aspects associated with two of the protrusions 402, 404 (i.e., a first example protrusion 402 and a second example protrusion 404) will be discussed herein. However, in some examples, such aspects likewise apply to one or more (e.g., all) of the other protrusions shown in FIG. 4. In particular, one or more of the protrusions 402, 404 are sized, shaped, structured and/or otherwise configured to impart a force or load on the outer surface 312 of the protector 310 such that at least one of the sensor(s) 101 experiences a pressure, thereby changing the sensor(s) 101 from the first state to the second state.

The protrusions 402, 404 of FIG. 4 are distributed along at least a portion of the length 313 of the cover body 302 (e.g. the entire length 313) between opposite ends thereof. For example, the first protrusion 402 is spaced from the second protrusion 404 by an example distance (e.g., 0.5 inches, 1 inch 2 inches, etc.) 406. Stated differently, adjacent ones (i.e., adjacent pairs) of the protrusions 402, 404 are spaced from each other by the distance 406 (e.g., a substantially equal distance). The distance 406 may slightly vary (e.g., by about +/−15% of an appropriate value corresponding to a distance) for the adjacent pairs of protrusions 402, 404. As such, the protrusions 402, 404 of FIG. 4 are considered to be regularly spaced or distributed along the body 302. However, in some examples, at least some of the protrusions 402, 404 are spaced and/or distributed differently (e.g., irregularly). Further, although FIG. 4 depicts the twenty four protrusions 402, 404, in some examples, the cover 301 has one or more additional, fewer and/or different protrusions.

As shown in FIG. 4, the body 302 includes and/or defines an example inner space (e.g., a channel) 408 that extends across at least a portion of the length 313. The inner space 408 is configured to receive at least a portion of the sensor(s) 101, the protector 310, and/or the protrusions 402, 404. Further, the body 302 also includes an inner surface (e.g., a curved surface) 410 formed by the space 408 and/or the protrusions 402, 404. As shown in FIG. 4, at least a portion of the body 302 has a cross-sectional area that is curved (e.g., c-shaped), which better conforms to the outer surface 312 of the protector 310. Although the example of FIG. 3 depicts the body 302 having a shape that is substantially tubular and/or cylindrical, in some examples, the body 302 is shaped differently.

In some examples, the protrusions 402, 404 are positioned on and/or affixed to the inner surface 410 and extend away therefrom, for example, via one or more fasteners and/or fastening methods or techniques (e.g., via an adhesive, welding, etc.). That is, in some examples, the body 302 and the protrusions 402, 404 are formed or produced separately and then coupled together. However, in some examples, the body 302 and the protrusions 402, 404 are formed or produced simultaneously such that the body 302 and protrusions 402, 404 are a single or integral component. For example, the body 302 and/or the protrusions 402, 404 are formed via one or more of an extrusion process, compression molding, injection molding, and/or any other appropriate manufacturing method or technique. In some examples, the body 302 and/or the protrusions 402, 404 include or are constructed of a high plasticity resin having sufficient moldability in addition to one or more advantageous properties (e.g., a relatively high strength and/or rigidity).

FIG. 5 is a cross-sectional view of the sensor cover 301 of FIG. 4 along line B-B. As shown in FIG. 5, one or more (e.g., all) of the protrusions 402, 404 have a length 502 and a thickness or height 504. In some examples, the height 504 is substantially uniform across the length 502. That is, the height 504 may slightly vary (e.g., by about +/−15% of an appropriate value corresponding to a height) across the length 502. Further, the body 302 has a thickness 506 defined between the inner surface 410 and an outer surface (e.g., a curved surface) 508 of the body 302 opposite the inner surface 410. In some examples, the thickness 506 is substantially uniform (e.g., varying by about +/−15% or less of an appropriate value corresponding to the thickness 506) from a first edge 510 of the body 302 to a second edge 512 of the body 302 (e.g., in areas of the body 302 that do not correspond to the protrusions 402, 404).

In some examples, the cover 301 includes an example lip 514 defined by the body 302 that curves outward and/or away from the inner space 408 (e.g., away from the c-shaped cross-section of the body 302), which facilitates covering an outer area of the protector 310. As shown in FIG. 5, the lip 514 defines the first edge 510 of the body 302 and extends along at least a portion of the length 313.

FIG. 6 is a cross-sectional view of the sensor cover 301 of FIG. 4 along line C-C. As shown in FIG. 6, one or more of the protrusions 402, 404 have a cross-sectional area that is tapered, which facilitates loading the sensor(s) 101 by generating pressure via an outer surface 602 of the protrusion(s) 402, 404. That is, the protrusion(s) 402, 404 have a width 604 that decreases across the height 504 from a proximal end of the protrusion(s) 402, 404 to a distal end of the protrusion(s) 402, 404. Also, in some examples, the width 604 is substantially uniform across the length 504. As such, the protrusion(s) 402, 404 of FIG. 5 have a first cross-sectional area at the proximal end associated with the body 302 and a second cross-sectional area at the distal end associated with the protector 310 and/or a portion (e.g., the sensing portion 802 (shown in FIGS. 8 and 9)) of the sensor 101 therein that is smaller than the first cross-sectional area. As such, when the body 302 receives a load, the second cross-sectional area experiences a pressure that is greater than a pressure experienced by the first cross-sectional area.

In some examples, the outer surface 602 is shaped to conform to a shape of the outer surface 312 of the protector 310 and/or the sensor 101, which better distributes the load on the sensor 101. Additionally, in examples where the body 302 and the protrusions 402, 404 are an integral component, the inner surface 410 of the body 302 is considered to include the outer surface 604 of the protrusion(s) 402, 404.

Figure 7:
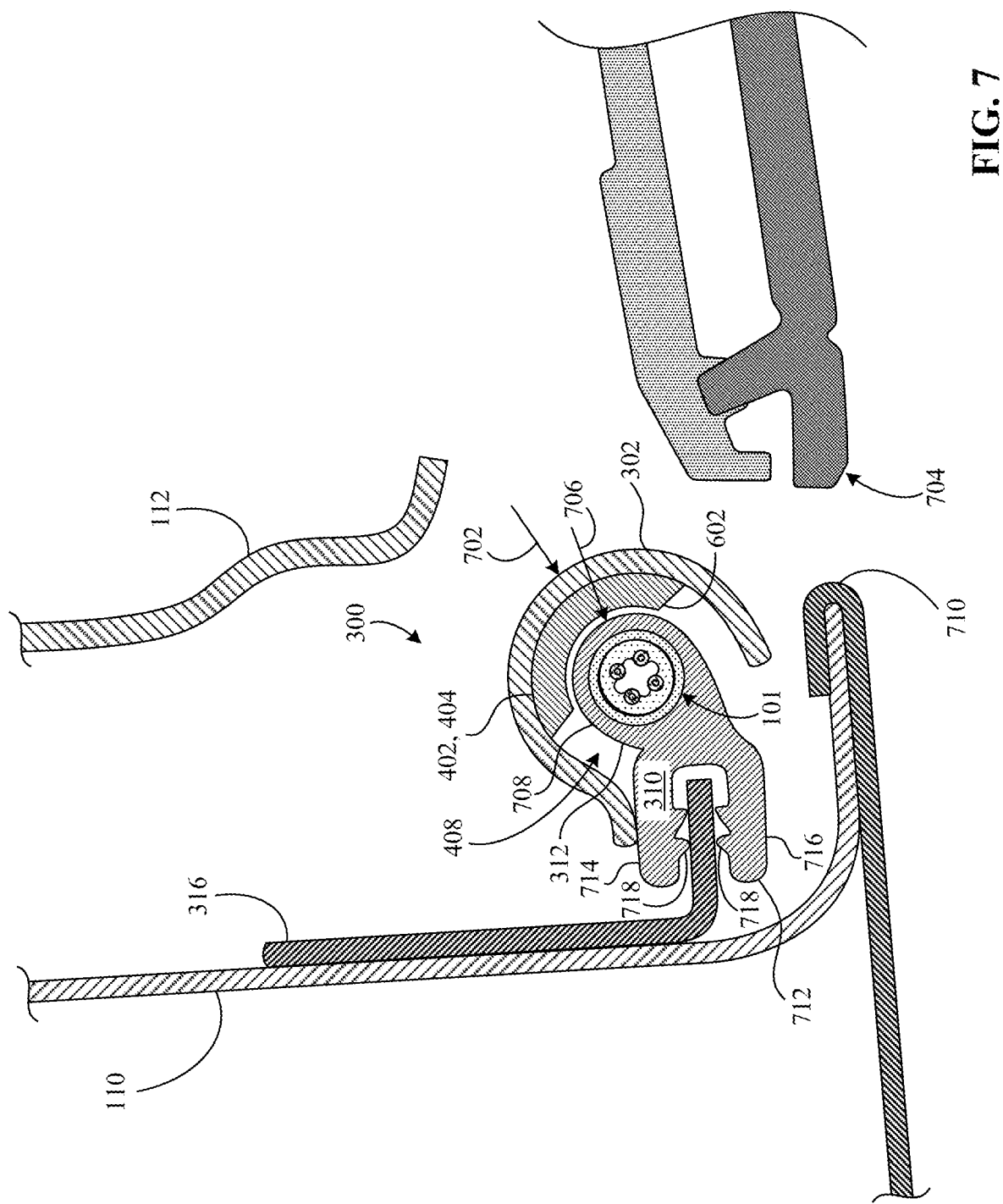
FIG. 7 is a cross-sectional view of an example gate of the example vehicle of FIG. 1 along line A-A.

FIG. 7 is a cross-sectional view of the gate 110 of the vehicle 100 of FIG. 1 along line A-A and shows one of the example sensor(s) 101, which is positioned in the protector 310 of the third sensor assembly 300. According to the illustrated example of FIG. 7, one or more of the protrusions 402, 404 are sized, shaped, structured, and/or otherwise configured to transfer a first force or load 702 from the body 302 to the sensor 101, thereby causing the sensor 101 to change from the first state to the second state and/or otherwise enabling the controller 106 to detect the load 702 via the sensor 101. That is, when the first load 702 is imparted on at least a portion (e.g., the outer surface 508) of the body 302 (e.g., via an object caught between the body 302 and the vehicle body 112 and/or a vehicle lamp 704 during closure of the gate 110), at least a portion (e.g., the outer surface 602) of the protrusion(s) 402, 404 imparts a second load 706 on the protector 310 and/or sensor 101. As a result, the protector 310 and/or the sensor 101 flexes, strains, and/or deforms in response to receiving the second load 706 from the protrusion(s) 402, 404. As such, the circumferential wall 708 of the protector 310 is relatively thin (e.g., compared to the thickness 506 of the body 302) and/or constructed of a material (e.g., rubber) that is substantially flexible.

In some examples, the body 302 experiences a first pressure resulting from the first load 702, and the sensor 101 and/or the protector 310 experience a second pressure resulting from the second load 706 (i.e., the second pressure is based on the first pressure). In some such examples, the protrusion(s) 402, 404 cause the second pressure to be greater than the first pressure due to a relatively small area of the outer surface 602 associated therewith. As shown in FIG. 7, the protrusion(s) 402, 404 are interposed between the protector 310 and the body 302. In some examples, the protrusion(s) 402, 404 are curved such that they extend around the sensor 101. Although FIG. 7 depicts the outer surface 602 of the protrusion(s) 402, 404 spaced from the outer surface 312 of the protector 310 by a relatively small distance (i.e., the outer surfaces 312, 602 are proximate to each other), in some examples, the outer surfaces 602, 312 are in contact with each other when the body 302 is unloaded.

As shown in FIG. 7, the bracket 316 includes a cross-section that is L-shaped. The bracket 316 is positioned such that the sensor 101, the body 302, and the protector 310 are proximate to and/or extend along the aforementioned edge (e.g., a curvilinear edge) 710 of the vehicle gate 110. Further, the protector 310 includes an example clip 712 extending away from the sensor 101 toward and over the bracket 316 (e.g., the clip 712 clamps the bracket 316), which enables the protector 310 and one or more components supported thereby (e.g., the sensor 101, the body 302, the protrusion(s) 402, 404, etc.) to couple to the gate 110. For example, the clip 712 includes a first portion 714 and a second 716 portion positioned on opposite sides of the bracket 316, each of which includes one or more teeth 718 that engage the bracket 316. Further, as shown in FIG. 7, the lip 514 of the cover 301 engages the outer surface 312 of the protector 310 to extend and/or increase a volume of the first space 408, which may prevent debris, dirt, water, etc. from entering the space 408 and/or otherwise affecting sensor functionality.

Figure 8:
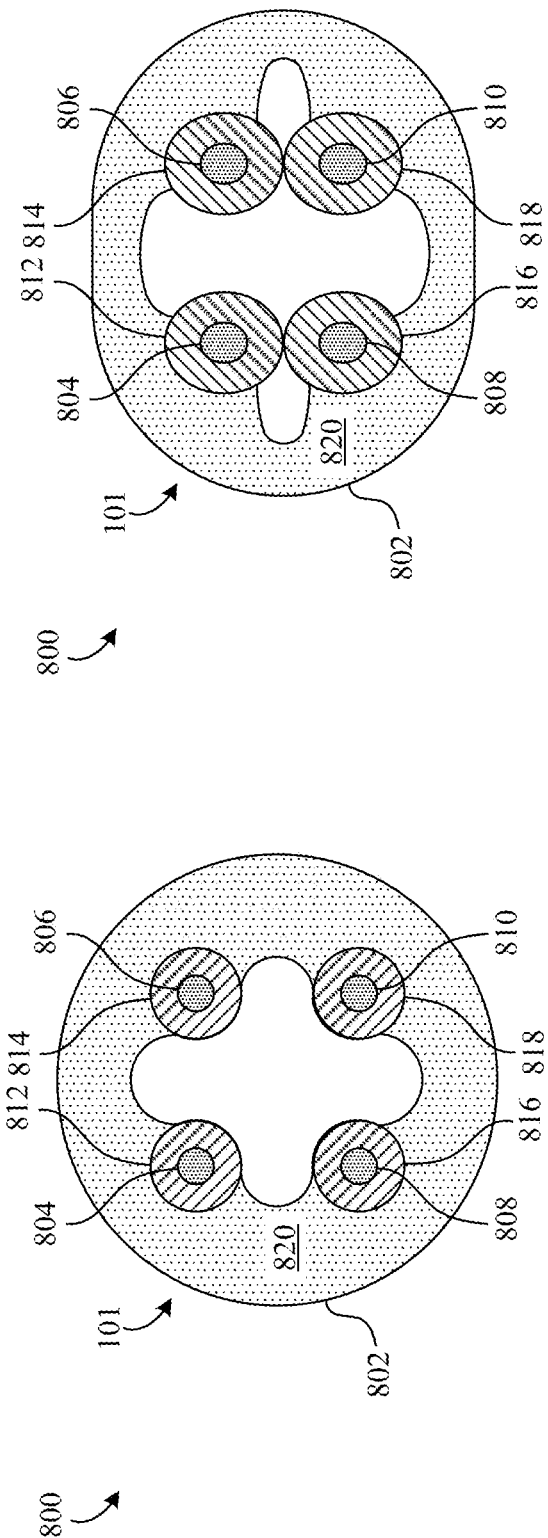
FIGS. 8 and 9 are cross-sectional views of an example touch sensor and show an example configuration thereof.
Figure 9:
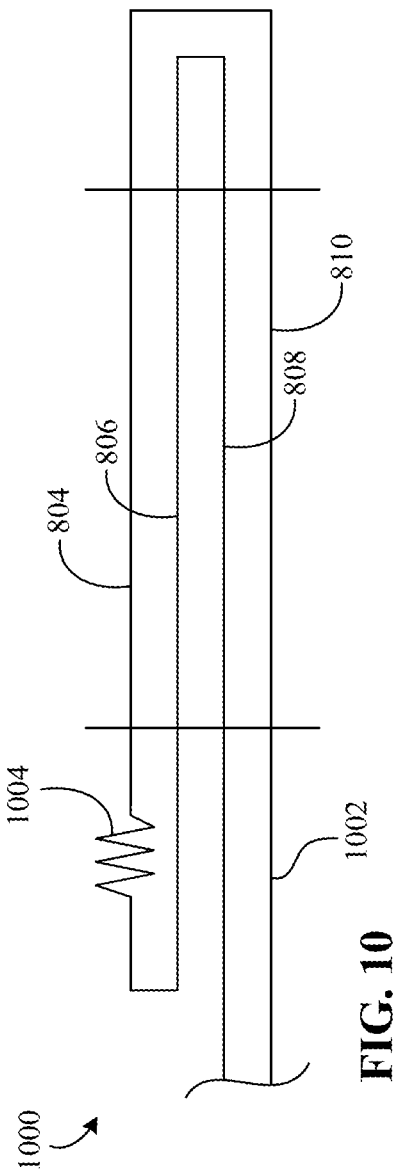

FIGS. 8 and 9 are cross-sectional views of one of the example sensor(s) 101 of FIG. 1 and show an example configuration 800 thereof. As previously mentioned, the sensor 101 of FIGS. 8 and 9 is structured and/or configured to change from the first state (shown in FIG. 8) to the second state (shown in FIG. 9) when pressed. As shown in FIGS. 8 and 9, the sensor 101 includes a sensing body or portion 802 in which one or more electrical conductors (e.g., one or more wires) 804, 806, 808, 810 are positioned, four of which are shown in this example, (i.e., a first conductor 804, a second conductor 806, a third conductor 808, and a fourth conductor 810). Further, the sensing portion 802 is configured to extend through protector 312. In some examples, the sensing portion 802 is centrally disposed within body 302. Although FIGS. 8 and 9 depict the sensing portion 802 portion that is cylindrically shaped, in some examples, the sensing portion 802 is shaped differently.

The conductors 804, 806, 808, 810 of FIGS. 8 and 9 are implemented, for example, via a twisted wire constructed of tin-plated annealed copper. In particular, the conductors 804, 806, 808, 810 form an example circuit 1000 (shown in FIG.

10) that is in communication with the controller 106 such that the controller 106 determines one or more characteristics and/or parameters of the circuit 1000 (e.g., a value corresponding to an electrical resistance).

In some examples, to facilitate changing the state of the sensor 101, the conductors 804, 806, 808, 810 are positioned in and/or in contact with respective electrodes (e.g., one or more conductive rubbers) 812, 814, 816, 818, as shown in FIGS. 8 and 9. The electrodes 812, 814, 816, 818 are concentrically positioned with and extend along respective ones of the conductors 804, 806, 808, 810.

As shown in FIG. 8, the electrodes 812, 814, 816, 818 are separated or spaced from each other, thereby providing the first state of the sensor 101. When the sensor 101 is in the first state, the circuit 1000 has a first resistance (e.g., a relatively high resistance). On the other hand, when the sensor 101 is in the second state, the circuit 1000 has a second resistance (e.g., a relatively low resistance) that is less than the first resistance. In such examples, the controller 106 is configured to detect such a change in resistance of the circuit 1000 and control movement of the gate 110 in response. To maintain the first state when the sensor 101 is not pressed and/or under pressure, the sensor 101 of FIG. 8 includes an example insulator (e.g., an insulating rubber) 820 coupled to the conductors 804, 806, 808, 810 and/or the electrodes 812, 814, 816, 818 to provide separation therebetween. The insulator 820 of the sensor 101 is sized, shaped, structured, and/or otherwise configured to flex, strain, and/or deform, for example, in response to receiving the second load 706 from the protrusion(s) 402, 404.

As shown in FIG. 9, the insulator 820 is deformed such that at least some of electrodes 812, 814, 816, 818 are engaging or in direct contact with other ones of the electrodes 812, 814, 816, 818, thereby providing the second state of the sensor 101. For example, the first electrode 812 is engaged with the third electrode 816. Further, in this example, the second electrode 814 is engaged with the fourth electrode 818.

Figure 10:
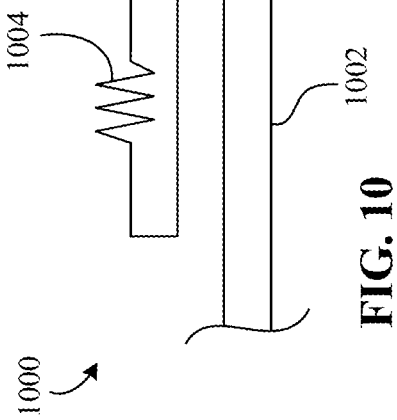
FIG. 10 is a schematic illustration of an example circuit that can be used to the implement the example touch sensor of FIGS. 8 and 9.

FIG. 10 is a schematic illustration of the aforementioned circuit 1000 that can be used to the implement the sensor 101 of FIGS. 8 and 9 and/or one or more of the other sensor(s) of FIG. 1. The circuit 1000 of FIG. 10 includes a primary electrical conductor (e.g., a lead wire) 1002 that is in communication with the controller 106. As shown in FIG. 10, the primary conductor 1002 forms and/or defines the first, second, third, and fourth conductors 804, 806, 808, 810. In such examples, each of the conductors 804, 806, 808, 810 is considered to be a segment of the primary conductor 1002. As previously mentioned, the circuit 1000 includes a resistance 1004 that is detected and/or monitored by the controller 106. In some examples, the resistance 1004 is inherent to the conductors 804, 806, 808, 810 and/or provided by one or more resistors coupled to the primary conductor 1002. In particular, when the sensor 101 changes from the first state to the second state, a value of the resistance 1004 decreases, which is detected by the controller 106.

Although FIGS. 8-10 depict particular sensor architecture, in some examples, one or more of the sensor(s) 101 are implemented differently, for example, using a tow wire architecture that includes only two wire segments.

It will be appreciated that touch sensor apparatus for use with vehicles disclosed in the foregoing description provide numerous advantages. Examples disclosed herein provide a vehicle touch sensor assembly including a sensor cover that has improved characteristics and/or parameters associated therewith. Disclosed examples effectively protect a touch sensor from damage while maintaining effectiveness of the touch sensor.

Although certain example apparatus have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A touch sensor assembly for a vehicle gate, comprising:
   a sensor operatively coupled to the vehicle gate, the sensor including conductors surrounded by an insulator; and
   a cover including a tubular body that extends over the sensor and including ribs between the tubular body and an outer surface of the insulator, at least one of the ribs configured to transfer a load from the tubular body to the sensor to change a state of the sensor.

2. The touch sensor assembly of claim 1, wherein at least one of the ribs is curved and extends at least partially around the touch sensor and an inner surface of the tubular body.

3. A touch sensor assembly for a vehicle gate, comprising;
   a sensor operatively coupled to the vehicle gate; and
   a cover including a tubular body that extends over the sensor and including ribs between the tubular body and the sensor, at least one of the ribs configured to transfer a load from the tubular body to the sensor to change a state of the sensor,
   wherein adjacent ones of the ribs are spaced from each other by a substantially equal or certain distance.

4. The touch sensor assembly of claim 1, wherein at least one of the ribs has a length and a height that is substantially uniform across the length.

5. The touch sensor assembly of claim 1, wherein at least one of the ribs is in contact with an outer surface associated with the sensor when the cover is unloaded.

6. The touch sensor assembly of claim 1, wherein the tubular body includes a cross-sectional area that is c-shaped.

7. The touch sensor assembly of claim 1, wherein the touch sensor includes a sensing portion that is cylindrically shaped and centrally disposed within the tubular body of the cover.

8. The touch sensor assembly of claim 7, wherein each of the tubular body and the sensing portion is at least partially curved or s-shaped to conform to a shape of the gate.

9. The touch sensor assembly of claim 1, wherein at least one of the ribs is tapered or substantially uniform across the length.

10. The touch sensor assembly of claim 1, wherein the cover and the ribs include a high plasticity resin.

11. The touch sensor assembly of claim 1, wherein the body includes a lip that extends at least partially along a length of the body and away from an inner channel defined by the body.

12. An apparatus, comprising:
- a vehicle touch sensor having a sensing portion that is cylindrically shaped; and
- a cover coupled to the touch sensor that defines an inner channel having the sensing portion, a wall formed by the inner channel having protrusions that extend toward the sensing portion, at least one of the protrusions configured to impart a first load on the sensing portion when a second load is imparted on the cover,
- wherein at least one of the protrusions includes an outer surface that is shaped to conform to an outer surface of the sensing portion.

13. The apparatus of claim 12, wherein at least one of the protrusions has a first cross-sectional area associated with an outer surface of the cover and a second cross-sectional area associated with an outer surface of the sensing portion, the first cross-sectional area smaller than the second cross-sectional area.

14. The touch sensor assembly of claim 1, further comprising:
- a protector between the ribs and the outer surface of the insulator, the protector configured to substantially cover the outer surface of the insulator and to transfer a load from the ribs to the sensor.

* * * * *